United States Patent [19]
Lyons et al.

[11] 3,933,118
[45] Jan. 20, 1976

[54] CHEMILUMINESCENT SIGNAL DEVICE

[75] Inventors: John H. Lyons, Ridgecrest; Steven M. Little, China Lake, both of Calif.; Vincent J. Esposito, Washington, D.C.

[73] Assignee: The United States of America as represented by the Secretary of the Navy, Washington, D.C.

[22] Filed: Mar. 26, 1974

[21] Appl. No.: 454,878

[52] U.S. Cl. .............. 116/63 P; 40/125 H; 40/138; 116/114 AM; 248/158
[51] Int. Cl.² .................... E01F 09/10; H05B 33/00
[58] Field of Search ........ 116/63 R, 114 AM, 63 P, 116/28 R; 240/2.25; 248/44, 46, 371, 160, 102, 158; 40/125 H, 125 N, 134, 138, 145 A

[56] References Cited
UNITED STATES PATENTS

| | | | |
|---|---|---|---|
| 960,497 | 6/1910 | Burkart, Jr. | 248/48 |
| 1,856,000 | 4/1932 | Smith | 248/44 |
| 1,863,756 | 6/1932 | Lufkin | 116/63 R X |
| 1,875,424 | 9/1932 | Darling, Jr. et al. | 40/125 H X |
| 2,002,756 | 5/1935 | Segelhorst | 40/125 N |
| 2,033,296 | 3/1936 | Porter | 248/102 |
| 2,767,497 | 10/1956 | Munson | 116/63 P |
| 3,105,457 | 10/1963 | Krueger | 116/63 P |
| 3,119,588 | 1/1964 | Keats | 248/44 X |
| 3,239,406 | 3/1966 | Coffman et al. | 116/114 AM |
| 3,292,569 | 12/1966 | Trigilio | 116/63 P |
| 3,386,409 | 6/1968 | Dawson | 40/125 N X |
| 3,589,328 | 6/1971 | Kiniry et al. | 116/63 P |
| 3,774,022 | 11/1973 | Dubrow et al. | 116/114 AM X |
| 3,819,925 | 6/1974 | Richter et al. | 240/2.25 |

Primary Examiner—Richard C. Queisser
Assistant Examiner—Daniel M. Yasich
Attorney, Agent, or Firm—R. S. Sciascia; Roy Miller; Gerald F. Baker

[57] ABSTRACT

A signal device combining a fluorescent or phosphorescent light tube and a weighted base designed to be thrown or dropped from a vehicle as a warning marker. The light tube is preferably of the chemically actuated type and the base preferably has four resilient legs serving to ensure that the device will assume an upright position when dropped.

5 Claims, 5 Drawing Figures

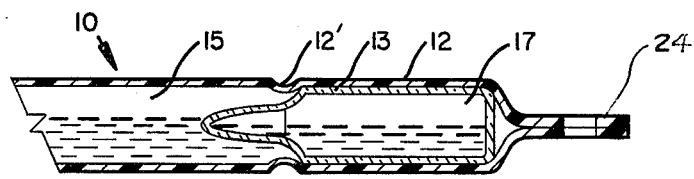
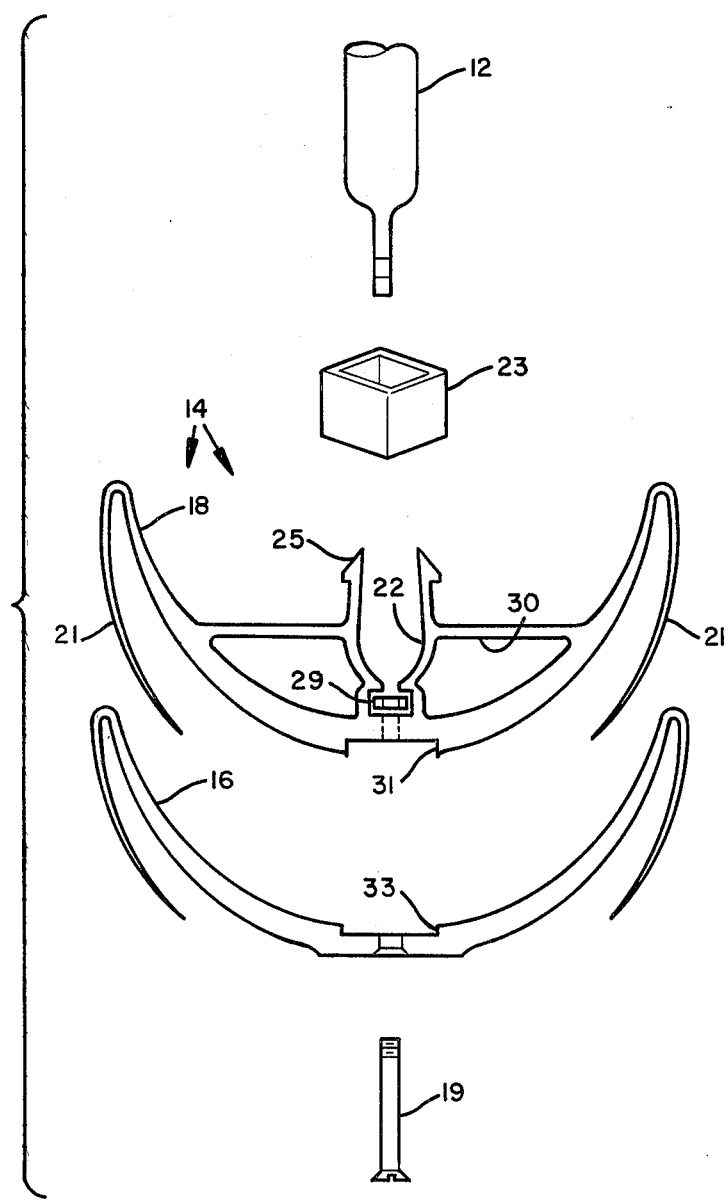

CHEMILUMINESCENT SIGNAL DEVICE

CROSS REFERENCE TO RELATED APPLICATIONS

Reference is made to Assignees' prior U.S. Pat. No. 3,764,796 and co-pending application Ser. No. 340,434 filed Mar. 12, 1973, now U.S. Pat. No. 3,819,925 each disclosing chemical lighting devices usable with the Signal Device of the present invention.

Reference is also made to Assignees' co-pending applications Ser. Nos. 454,877 and 454,876 filed of even date which disclose similar signal devices.

BACKGROUND OF THE INVENTION

Many kinds of emergency flares, flags, reflectors and the like have been devised and used, for example, to warn approaching motorists that a disabled vehicle is present along a highway. All of the known devices, however, take considerable time to deploy, many are fire hazards, and most are susceptible to the destruction of their effectiveness when struck or run over by passing vehicles.

According to the present invention, a device is provided which may be dropped or thrown from a vehicle or otherwise placed on the roadway without the necessity for taking time to "set up" the device. When used with a chemically actuated light tube, for instance, the signal device may be easily seen at great distances, is fire proof, and is not easily rendered ineffective by being struck or run over by passing vehicles.

BRIEF DESCRIPTION OF THE DRAWINGS

FIG. 1 is a longitudinal sectional view of a typical bi-reactant chemical illuminating device usable in carrying out the present invention;

FIG. 2 is an exploded view of one embodiment of the invention;

DESCRIPTION AND OPERATION

Figure 3:
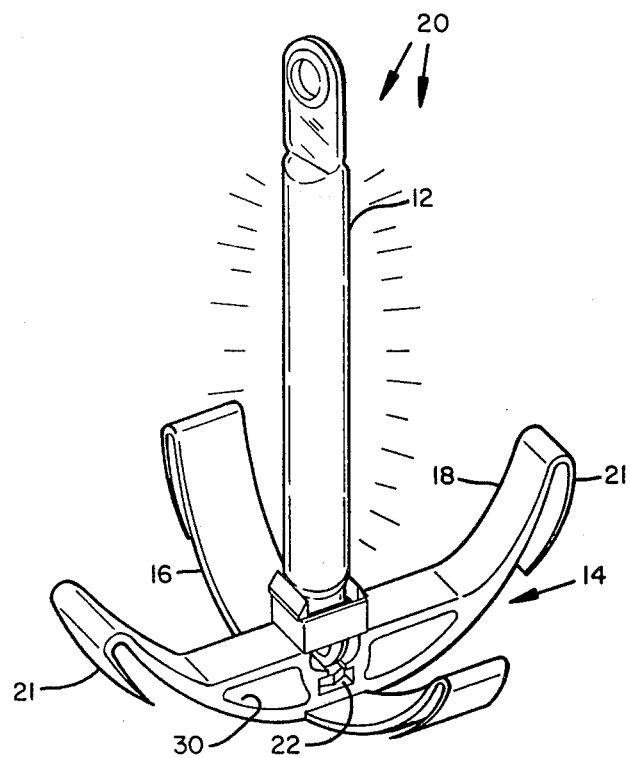
FIG. 3 is an assembled view of the device of FIG. 2.

Shown in FIG. 1 generally designated by numeral 10 is a chemical lighting device having an outer cylindrical tube 12 of translucent material and containing a frangible ampoule 13 positioned inside the cylinder. The ampoule 13 is maintained in position by an indentation 12' in tube 12.

Tube 12 is made of a durable nonbreakable material such as clear radiation-crosslinked polyolefinic plastic tubing. The end 24 of the tube is flattened and sealed by application of heat and the flattened end may be pierced and the opening fitted with a grommet. The ampoule 13 contains an activator material and is preferably made of glass which may be easily broken to effect mixing with the chemiluminescent material 15 which substantially fills the remainder of the tube 12. The lighting device may also be of the type disclosed in assignee's prior U.S. Pat. No. 3,764,796 referenced above. The chemical lighting device of the prior patent contains two ampoules. In other words, one ampoule contains a chemiluminescent material and the other ampoule contains an activator material. Since these chemical lighting devices are the inventions of others, applicants make no claim to invention of these devices per se.

Chemiluminescent materials usable as reactants in the light tube might be an oxalate ester such as bis (2, 4, 5-trichloro-6-carbopentoxyphenyl) oxalate, and a fluorescer such as 9, 10 bis (phenylethynly) anthracene.

A first embodiment of the roadside signal according to the present invention, is shown in FIG. 2 wherein a base generally designated by numeral 14 is contoured to receive the light tube 12. Base 14 comprises two rotatable base members 16, 18 which may be fastened together, for example, by means of screw 19 and nut 29. Both base members may have downwardly folded resilient arms 21 to aid in maintaining the device in an upright position. The device is assembled by placing the light tube 12 in cavity 22 and forcing a keeper 23 over the tabs 25 of the upper base member 18.

The keeper 23 may be of lead of some other heavy material to lower the center of gravity of the assembled device and lend stability thereto. Alternatively, the cavity 30 in base member 18 may be filled with heavy material. The two halves of the base 16, 18 are packaged fastened together by screw 19 and nut 29 and with keeper 23 in place. The light tube is packaged separately.

The fully assembled device ready for use is shown in FIG. 3. Assuming that the ampoule or ampoules have been broken before assembly the signaling device when thrown or placed on the roadway will give off light for the life of the chemical mixture. The base is designed to maintain the light tube in an upright position on the roadway even when thrown or dropped from a moving vehicle.

Figure 4:
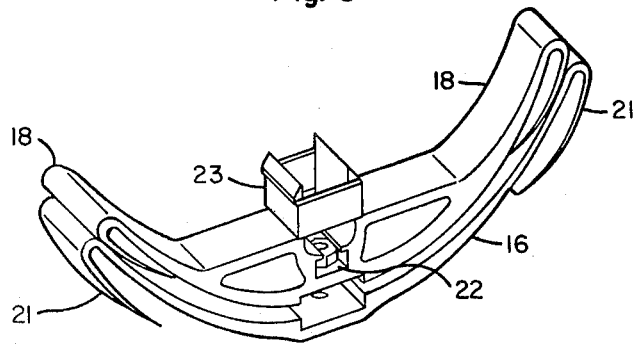
FIG. 4 is a view of the holder of FIG. 2 folded for storage.

The two halves of the base are rotatable around screw 19 to present a flat package for storage as shown in FIG. 4.

Figure 5:
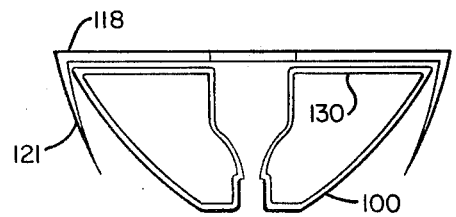
FIG. 5 is a side elevation partly in section of a second embodiment of the invention.

An alternative base is illustrated in FIG. 5 wherein the cup shaped base member 100 is surmounted by one or more rotatable members 118 having resilient depending fingers 121. The cup shaped member 100 has a cavity 130 which may be filled with heavy material for lowering the center of gravity as mentioned in the description of the first embodiment.

Although the base members have been illustrated in combination with a particular chemical light member, it is obvious that any visual augmentation device of a similar size and shape could be used with the base member herein described.

What is claimed is:

1. A traffic signal marker comprising:
   an unbreakable elongated light transmitting tube containing two manually miscible chemical reactants;
   said reactants, when mixed, being effective to emit light from said light transmitting tube;
   a base member securedly receiving one end of said tube;
   said base member comprising first and second support members;
   said support members being arcuate in form and having upwardly facing concave surfaces and bottom surfaces for contacting a horizontal surface; and
   each said support member having upturned peripheral ends with attached resilient downwardly projecting outboard stabilizing prongs, said bottom surfaces and said stabilizing prongs coacting to contact a supporting surface at approximately right angles thereto and to maintain the light tube in an upright position when the signal marker is deployed on the horizontal surface.

2. The device of claim 1 wherein said support members comprise an uppermost member and a lowermost member and said uppermost member comprises a chamber for receiving the end of said tube; and lock means including upstanding abutment means on said uppermost support member and tubular retaining means fitted over said upstanding means for retaining the end of said tube in said chamber.

3. A traffic signal marker comprising:

an unbreakable elongated light transmitting tube containing chemiluminescent reactant material means;

a base member securedly receiving one end of said tube;

said base member comprising first and second support members;

each said support member being arcuate in form and having upwardly facing concave surfaces and bottom surfaces for contacting a horizontal surface when deployed thereon, each end of the upwardly concave surfaces of the support members having a downwardly projecting resilient arm member;

said support members being rotatably fastened together at their lower extremities and having interlocking facing surfaces;

each support means being relatively movable from a co-linear storage position to an orthogonal deployment position whereat said interlocking facing surfaces effectively lock the two support means together.

4. The device of claim 3 wherein each of said first and second support members are arcuate in form having upwardly facing concave surfaces: and each said end of the support member having peripheral ends with attached resilient downwardly projecting outboard stabilizing prongs adapted to contact a supporting surface at approximately right angles thereto when the signal marker is deployed.

5. The device of claim 4 wherein said support members comprise an uppermost member and a lowermost member and said uppermost member comprises a chamber for receiving the end of said tube; and lock means including upstanding abutment means on said uppermost support member and tubular retaining means fitted over said upstanding means for retaining the end of said tube in said chamber.

* * * * *